Dec. 25, 1956  P. J. IMSE ET AL  2,775,156
SPRING CLIP FOR SPROCKET CHAINS
Filed July 10, 1952
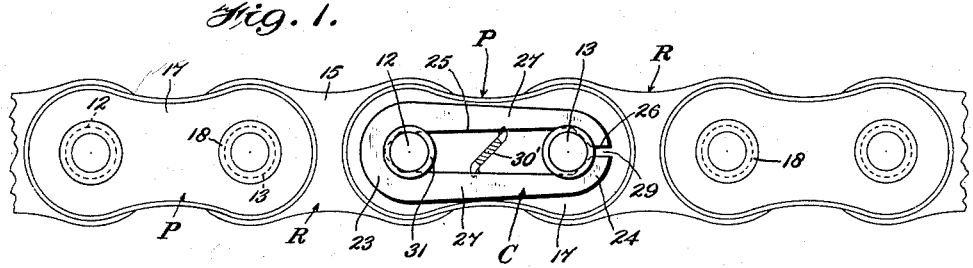
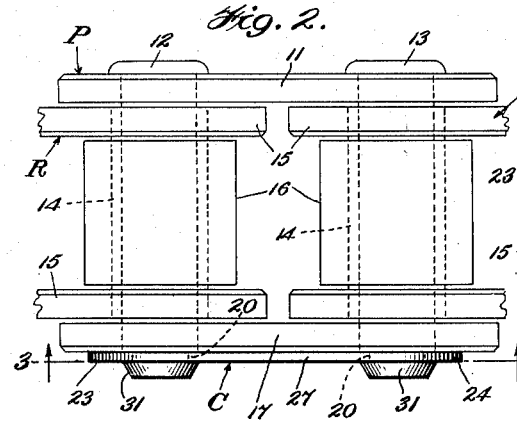
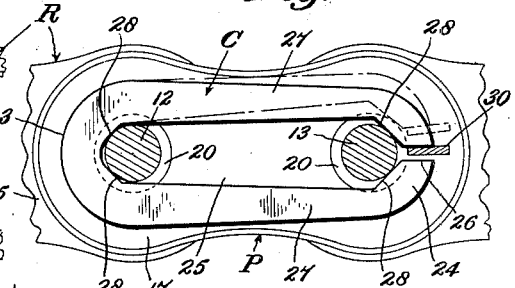
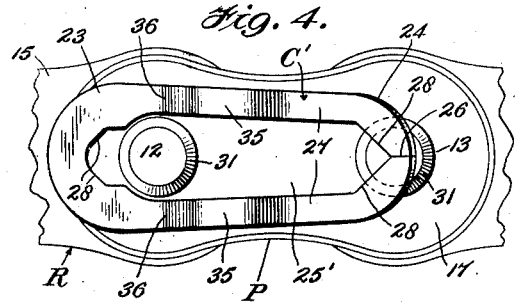
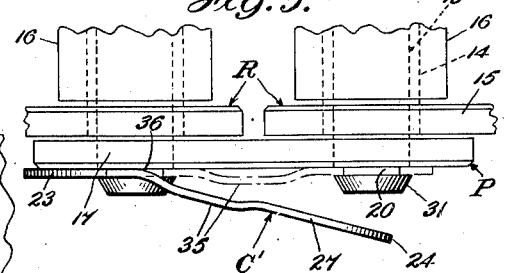
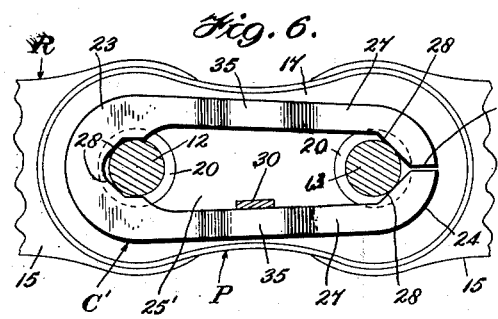
INVENTORS
Philip J. Imse and
Earl E. Swansen,
BY
ATTORNEY

# United States Patent Office 2,775,156
Patented Dec. 25, 1956

2,775,156

SPRING CLIP FOR SPROCKET CHAINS

Philip J. Imse, Westfield, Mass., and Earl E. Swansen, Suffield, Conn., assignors to Chain Belt Company, Milwaukee, Wis., a corporation of Wisconsin Application July 10, 1952, Serial No. 298,146

5 Claims. (Cl. 85—8.8)

This invention realtes to a device for maintaining sprocket chain elements in assembled relation, commonly known to the trade as a "spring clip," and has for its principal object the provision of an improved device of this character which will be more efficient in use and capable of more facile application and removal than those which have been heretofore proposed.

These clips are of the type basically comprising an elongated loop-like spring metal member split at one end whereby the spaced legs may be sprung apart to accomplish the engagment and disengagement of the metal at the ends of the eye with circumferential grooves formed on the projecting end portions of an adjacent pair of chain pins. In prior devices of this nature the ends of the eye have been formed as semi-circles normally conforming substantially to the bottom circumference of the pin grooves and with their centers spaced to coincide with the axes of an adjacent pair of pins. However, unless the clips be manufactured with a degree of precision not commonly employed in the trade there is danger that the eyes of at least some of them will be slightly longer than the chain pitch with the result that such clips will be sufficiently loose on the pins to permit vibration of the clip when the chain is running. Such vibration of the clips may produce wear thereof and result in their dislodgement from the chain pins, thereby permitting the latter to work out of the links they normally connect and the chain to fly apart, with possible disastrous results. The present invention provides a construction which substantially eliminates this shortcoming of the prior devices.

The prior clips customarily are flat throughout their length and when in position on a chain the entire inward faces of the legs lie flat against the outward face of the chain side plate with which the clip is associated. While it is possible to insert the end of a screw driver blade into the eye and by pressing it against one or both legs to spread the latter sufficiently to disengage the split end of the clip from its pin, since the clips ordinarily are only a few hundredths of an inch in thickness, the screw drivers not infrequently slip out of engagement before the removal operation is completed, sometimes with injury to the hands of the operator. In one of its forms the present invention provides a construction which overcomes this objection, and also facilitates the application and removal of the clip.

Two illustrative forms of clip embodying the features of the invention have been shown in the accompanying drawing forming a part of this specification, in which like reference characters designate like parts in all the views, and in which:

Figure 1 is a side elevational view of several links of a conventional roller sprocket chain, showing a clip embodying one form of the present invention applied to one of the links;

Fig. 2 is an enlarged plan view of such link and clip;

Fig. 3 is a sectional-elevational view on the plane indicated by the line 3—3 in Fig. 2, looking in the direction of the arrows;

Fig. 4 is a side elevational view of a roller chain link showing a clip embodying a modified form of the present invention in the process of application thereto;

Fig. 5 is a partial plan view of the parts as shown in Fig. 4;

Fig. 6 is a sectional-elevational view similar to Fig. 3, but showing the modified form of clip shown in Figs. 4 and 5 in seated, operative position; and Fig. 7 is a perspective view of the said modified form of the clip.

The conventional sprocket chain shown in the drawing comprises alternate pin links P and roller links R, each of the former of which is composed of a side plate 11 rigidly carrying a pair of chain pins 12 and 13 upon which are journaled the bushings 14 which rigidly connect the spaced side plates 15 of the roller links. A sprocket engaging roll 16 is journaled upon each bushing, between the side plates 15. Each pin link also includes a side plate 17 mounted on the end portions of the pins 12 and 13 which project beyond the roller links. In some instances each pin link is equipped with a spring clip to retain the parts in assembled relation, while in other cases only one such link is so equipped, with the projecting ends of the pins of the other links being riveted or peened over at assembly, as indicated at 18 in Fig. 1, whereby to permanently retain the parts of such links in position. The end portions of such pins 12 and 13 as are to receive spring clips are circumferentially grooved as at 20, such grooves being located just outwardly of the outward face of the side plate 17 and being of a width substantially equal to the thickness of the spring clip.

The spring clip C shown in Figs. 1–3 is a flat elongated loop-like member of resilient metal having semi-circular end portions 23 and 24, and the elongated eye 25 of which is of a width substantially equal to the diameter of the chain pins 12 and 13 at the bottom of the grooves 20. The end portion 24 is medially severed as at 26 whereby the transversely spaced legs 27 may be sprung laterally and outwardly or inwardly as may be desired to permit the application and removal of the device to and from the chain. The ends of the eye 25, instead of being semi-circular as in the prior devices, are formed as straight edges or surfaces 28, the pair at each end of the eye being disposed at convergent angles to one another substantially as shown. The said surfaces are adapted to tangentially engage the bottom surfaces of the pin grooves 20 at only angularly spaced points thereon, as will be understood from Fig. 3, and they are so located that the longitudinal dimension of the clip which corresponds to the pitch of the chain (which dimension, for convenience, is herein referred to as the "pitch" of the clip) is actually a few thousandths of an inch less than the chain pitch. It results therefrom that when the surfaces 28 at the opposite ends of the eye are in engagement with the bottoms of the respective pin grooves the severed end portion 24 of the clip will not be completely closed but there will be a gap 29 between the adjacent edges of the cut, as clearly shown in Figs. 1 and 3. The resilience of the metal, of course, will always be tending to close this gap and thus the convergent surfaces 28 of the clip will always be maintained in intimate tangential engagement with the bottoms of the pin grooves, thereby preventing looseness and detrimental vibration of the clip. The gap 29 also can be used as a convenient place for the insertion of the end of a screw driver blade or similar removing tool 30, as shown in Fig. 3, whereby the legs 27 of the clip may be sprung outwardly to the indicated broken line position to disengage the end portion 24 from the pin groove. However, the preferable means for removing the clip is by inserting a screwdriver or a tool such as that shown in U. S. Patent No. 2,577,193 to P. J. Imse between the legs 27 as indicated at 30' in Fig. 1.

In applying these clips to a chain the usual practice is to spread the legs 27 sufficiently to enable the split end 24 of the clip to pass over the extreme end portion of one of the pins and seat in the groove 20 thereof, whereupon the clip is slid longitudinally of itself to seat the closed end 23 in such groove and the action as regards the split end repeated to engage it with the other pin. The application of the split end of the clip to the pins will be appreciably facilitated if the extreme end portions of the latter be beveled, as indicated at 31, for mere pressure of the split end of the clip against the bevels will effect the necessary spreading of the legs 27 and permit them to snap into the pin grooves.

In the form of the invention shown in Figs. 4–7 the legs 27 of the clip C' are modified by having outward bulges or offsets 35 formed in their intermediate portions. When this clip is in its operative position, shown in Fig. 6 and in broken lines in Fig. 5, these offsets, being appreciably spaced from the outward face of the side plate 17, provide better seats against which to engage the end of the removing tool 30 or 30' and greatly reduce or eliminate slipping of the latter during a removal operation.

Since the offsets or bulges 35 in the clip legs would interfere with the longitudinal sliding of the clip in the pin grooves 20 in the course of its application or removal, the width of the eye 25' is increased, either at one point adjacent the closed end 23, or as shown, substantially throughout its length, to a dimension which will permit said closed end portion 23 of the clip to be freely slipped over the projecting end portion of the pin 12, as illustrated in Fig. 4, whereupon by sliding the clip a short distance toward the right, as viewed in said figure, the convergent edges 28 of said clip portion 23 may be entered into the groove 20 of said chain pin. This will bring the split end portion 24 of the clip into proper position in relation to the pin 13 for such end portion to be pressed against the bevel 31 of said pin whereby to spread the legs 27 and snap the angularly disposed surfaces 28 of the end portion 24 into the groove 20 of the pin.

Whether the clip be of the type illustrated in Figs. 1–3, or that shown in Figs. 4–7, the width of the respective eyes 25, 25' in relation to the diameter of the chain pins 13 is such that when the clip is in operative position on a chain, with the convergent surfaces 28 in arcuately spaced contact with the bottoms of the chain pin grooves 20 as shown in Figs. 3 and 6, at least those portions of the inner edges of the clip legs 25 which are adjacent the split end of the clip will not engage the said groove bottoms, whereby the resilience of the legs may constantly maintain the contact between the convergent surfaces 28 and the groove bottoms, and thus prevent vibration of the clip.

The end portion 23 of the clip C' may be given a permanent angular set, at the points 36, with respect to the plane of the legs 27 and split end portion 24, so that the clip normally appears as shown in Fig. 7 and in full lines in Fig. 5. The degree of angular set has been somewhat exaggerated for purposes of illustration, it being understood that it will suffice to provide an angle sufficient to cause the split end 24 of the clip to just clear the end of pin 13 when the end portion 23 is seated in the groove 20 in pin 12. This angular set facilitates application of the clip to the pin 12 in the manner above described, and also its removal from the link since the tendency of the legs 27 to resume the angular relationship to the face of the link side plate 17 shown in Fig. 5 will cause them to automatically snap to such position when the split end 24 is spread to disengage its surfaces 28 from the groove of pin 13.

What is claimed is:

1. A spring clip for ready application to and removal from the circumferentially grooved end portions of a pair of adjacent sprocket chain pins, said clip comprising a resilient metal element having an elongated eye defined by a pair of spaced longitudinal legs which are connected at one end of the eye and unconnected at its other end, the metal defining the ends of the eye being provided with straight convergent surfaces adapted to tangentially contact arcuately spaced portions only of the bottoms of the chain pin grooves, and said eye being of a width relative to the chain pin diameter to prevent engagement between the inward edges of said legs and said groove bottoms when the convergent surfaces are in contact with the latter, whereby the resilient action of the legs may constantly maintain such contact between said convergent surfaces and groove bottoms and prevent vibration of the clip.

2. A spring clip for ready application to and removal from the circumferentially grooved end portions of a pair of adjacent sprocket chain pins, said clip comprising a resilient metal element having an elongated eye defined by a pair of spaced longitudinal legs which are connected at one end of the eye and unconnected at its other end, the metal defining each end of said eye being formed with a pair of straight convergent surfaces adapted to tangentially contact arcuately spaced portions only of the bottoms of the chain pin grooves, such surfaces at the respective ends of the eye being spaced to give the clip a pitch which is slightly less than the chain pitch, and said eye being of a width relative to the chain pin diameter to prevent engagement of the inward edges of said legs with said groove bottoms when said convergent surfaces are in contact with the latter, whereby the resilient action of the legs may constantly maintain such contact between said surfaces and groove bottoms and thereby prevent vibration of the clip.

3. A spring clip for ready application to and removal from the circumferentially grooved end portions of a pair of adjacent sprocket chain pins, said clip comprising a resilient metal element having an elongated pin-receiving eye defined by a pair of spaced longitudinal legs which are connected at one end of the eye and unconnected at its other end, like portions of each of said legs intermediate the end portions thereof being offset from the plane of said end portions to provide bulges engageable by a tool inserted between the legs whereby the latter may be spread one from the other to effect removal of the clip from the chain pins, and the eye having portions at its ends engageable in the chain pin grooves and an enlarged portion adjacent the closed end of the clip freely accommodating the ungrooved portions of a chain pin, whereby the clip may be disposed in and removed from operative position with a minimum of longitudinal translation for effecting engagement of the first mentioned eye portions in the chain pin grooves and their disengagement therefrom.

4. A spring clip for ready application to and removal from the circumferentially grooved end portions of a pair of adjacent sprocket chain pins, said clip comprising a resilient metal element having an elongated pin-receiving eye defined by a pair of spaced longitudinal legs which are connected at one end of the eye and unconnected at its other end, said eye having portions at its ends engageable in the chain pin grooves and an enlarged portion adjacent the closed end of the clip freely accommodating the ungrooved portions of a chain pin, whereby the clip may be disposed in and removed from operative position with a minimum of longitudinal translation for effecting engagement of the first mentioned eye portions in the chain pin grooves and their disengagement therefrom, and the closed end portion of the clip being disposed in a plane making an obtuse angle with the plane of the remainder of the clip.

5. A spring clip for ready application to and removal from the circumferentially grooved end portions of a pair of adjacent sprocket chain pins, said clip comprising a resilient metal element having an elongated pin-receiving eye defined by a pair of spaced longitudinal legs which are connected at one end of the eye and unconnected at its other end, said legs having convergent surfaces at the ends of said eye engageable with the grooves of the pins at arcuately spaced points only, and each of said legs also having a portion intermediate its end portions laterally offset from the plane of said end portions to provide bulges engageable by a tool inserted between the legs whereby the latter may be spread one from the other to effect removal of the clip from the chain pins, the eye having an enlarged portion adjacent the closed end of the clip freely accommodating the ungrooved portions of a chain pin, whereby the clip may be disposed in and removed from operative position with a minimum of longitudinal translation for effecting engagement of said groove-engaging portions of the legs in the chain pin grooves and their disengagement therefrom, and the closed end portion of the clip being disposed in a plane making an acute angle with the plane of the remainder of the clip.

References Cited in the file of this patent

UNITED STATES PATENTS

| | | |
|---|---|---|
| 430,631 | Dierdorff | June 24, 1890 |
| 589,683 | Appleby | Sept. 7, 1897 |
| 617,716 | Caldwell | Jan. 17, 1899 |
| 727,913 | Dixon | May 12, 1903 |
| 769,905 | Jeutter | Sept. 13, 1904 |
| 1,054,274 | Burleigh | Feb. 25, 1913 |
| 1,114,123 | Dalton | Oct. 20, 1914 |
| 1,664,890 | Krejci | Apr. 3, 1928 |
| 1,907,506 | Coburn | May 9, 1933 |
| 1,968,557 | Johanson | July 31, 1934 |
| 2,203,397 | Taylor | June 4, 1940 |
| 2,466,639 | Focke | Apr. 5, 1949 |
| 2,512,691 | Smith | June 27, 1950 |

FOREIGN PATENTS

| | | |
|---|---|---|
| 9,326 | Great Britain | Apr. 15, 1911 |
| 168,247 | Great Britain | Sept. 1, 1921 |